United States Patent Office 3,424,625
Patented Jan. 28, 1969

3,424,625
PROCESS FOR WELDING LEAD ONTO LEAD UTILIZING A SPECIAL FLUX COMPOSITION
Ernest G. Tiegel, Redwood City, Calif.
(Bragato Road, Belmont, Calif. 94002)
No Drawing. Filed Nov. 9, 1965, Ser. No. 507,059
U.S. Cl. 148—23          8 Claims
Int. Cl. B23k 35/36; H01m 35/32

ABSTRACT OF THE DISCLOSURE

A process for welding lead onto lead particularly adapted for welding lead battery elements such as connector straps and plate lugs by either the cast on process or lead burning process, but utilizing a special flux composition by applying the composition prior to welding; said composition comprising as the active ingredient a dicarboxylic acid of the formula $$HOOC(CH_2)_nCOOH$$

where $n$ is an integer from 3 to 10. The active ingredient is preferably dissolved in a suitable solvent in order to render the material liquid, but with a major portion of the active ingredient; the preferred solvent being dimethyl sulfoxide.

---

The present invention relates to improvements in a Flux Composition for Use in Welding Lead Onto Lead, and more particularly to an improved flux composition suitable for use in welding lead battery elements in the fabrication and construction of storage batteries.

In accordance with usual practices, batteries are made by first casting a group of flat, rectangular plates having protecting lugs at one corner thereof with the plates being cast entirely of lead. The plates are then pasted to add lead oxide thereto. The plates may then be assembled as complete battery units and formed or "charged" in sulfuric acid to provide a conventional battery or, alternatively, the plates may be formed in sulfuric acid at any time during the manufacture of the battery. The forming of the plates before assembly thereof has been rather common in the manufacture of so-called "dry charge" batteries.

In all of these systems, however, the connector lugs of the plates are attached to connector battery straps having appropriate terminal posts in order to provide the aligned assembly of stacks of positive and negative plates and the necessary electrical connections therefor. The attachment of the plates to the connector lugs is conventionally done either by a method known as the "cast-on" method or by another method known in the art as a burning operation. In its broad aspect, the present invention relates to improvements in the welding of lead onto lead during the assembly of the battery, regardless of which process is used. However, the present invention is particularly advantageous when used with the cast-on process, because it is more difficult to obtain satisfactory welds with the cast-on process.

Whether the battery plates are attached to the connector lugs by a burning process or by a cast-on process, the operation is substantially a welding operation. Since lead tends to form oxide rather easily, it is desirable to utilize a flux in carrying out the welding. In the cast-on process in particular, heretofore it has been found desirable to completely clean the battery lugs and provide them with a liquid flux composition that will protect the lugs and assist in obtaining a desirable weld. Thus, in accordance with prior processes, good welds could be obtained by utilizing conventional fluxes provided that a minimum amount of oxide coating was present on the surfaces to be welded. Accordingly, prior to this invention, it was necessary to mechanically clean surfaces and remove oxide before welding in order to be positively assured of a satisfactory weld.

However, in accordance with the present invention, it has been found that by utilizing an improved flux composition, good satisfactory welds may be obtained without mechanical removal of oxide coating, and still maintain a virtually 100% reliability in the welding operation. Since the battery plates are often stored for a period of time prior to welding, it quite frequently happens that lead oxide coatings will build up to such an extent that removal is necessary unless excellent flux such as that provided by this invention is incorporated in the welding process. This problem is particularly acute because the battery plates will be subjected to atmospheric corrosion and the like under factory atmosphere conditions, and this provides an unusually rapid build-up of lead oxide coatings.

Another problem which has arisen in connection with the fabrication of batteries is contact of the connector lugs with the paste in the pasting machine, and care is generally taken to avoid such contact. This care will tend to slow down even an experienced operator and add to the over-all costs of produciton. However, it is found that when utilizing the improved flux of this invention, some contact of paste on the lugs can be tolerated without prevention a satisfactory weld to be made in the subsequent welding operation.

Accordingly, it is a primary object of this invention to provide an improved flux composition for use in welding lead onto lead by the conventional processes utilized in the fabrication of lead storage batteries whereby time-saving and cost-saving may be achieved in the over-all process.

Another object of the invention is to provide an improved flux composition for use in welding lead surfaces in which a greater reliability and assurance of satisfactory welds is obtained.

A further object of the invention is to provide an improved flux composition of the character described which is non-inflammable, non-evaporating, and safe and convenient to handle.

Further objects and advantages of the invention will be apparent as the specification progresses, and the new and useful features of the Flux Composition for Use in Welding Lead Onto Lead will be fully defined in the claims attached hereto.

In general, the invention provides a flux composition for use in welding lead onto lead by conventional processes such as the cast-on process and the burning process utilized in the fabrication of lead storage batteries. The composition comprises as the active ingredient a dicarboxylic acid of the formula $$HOOC(CH_2)_nCOOH$$

where $n$ is an integer from 3 to 10.

As used herein, the term "lead" is to be construed to include lead alloys which contain a major portion of lead and a minor portion of other ingredients generally found in lead alloys. For example, the lead plates of storage batteries to which this invention is particularly useful generally contain about 4% antimony and therefore alloys consisting of 96% lead and 4% antimony are within the ambit of this invention. Obviously, any other suitable alloy could be used, and the present invention is to be in no way limited by the exact composition of the lead alloys to be welded according to the invention, although, in general, such lead alloys will contain at least 90% by weight of lead.

As indicated above, it has been found that dicarboxylic acids of the character described are particularly effective as a flux for welding lead so that it is not necessary to remove the lead oxide prior to welding in most welding operations. The preferred dicarboxylic acid is azelaic acid, but it is the dicarboxylic character of the acids which is considered to be particularly valuable, i.e., having an active carboxyl group at both ends of the chain. Prior to the present invention, certain monocarboxylic acids such as conventional fatty acids have been used to advantage, but the dicarboxylic acids have an unexpectedly improved advantage thereover. For example, oleic acid has been used to advantage as a flux for welding lead, but large amounts of lead oxide cannot be tolerated when oleic acid is used.

It is possible to include with the dicarboxylic acid other ingredients which do not have an adverse affect on welding lead, but it is preferred to utilize a major portion of the dicarboxylic acid in the over-all composition.

In fact, in the preferred composition made according to this invention, the normally solid dicarboxylic acid is provided in a liquid state by solution in any suitable organic solvent capable of dissolving the acid and yet capable of burning away or otherwise dissipating during the subsequent welding operation. Accordingly, it is generally possible to utilize any suitable solvent such as the lower alcohols, ethers, aldehydes or ketones. All of these oxygenated organic compounds are capable of dissolving the dicarboxylic acid and providing a solution in which a major portion of the solution consists of the dicarboxylic acid and a minor portion of the solution consists of the organic solvent material.

The purpose of this solvent material is to render the flux liquid so that it is possible to provide easier application and assure an absolutely complete coating or fluxing over the entire surface to be welded.

Although it is advantageous to utilize an oxygenated compound of short chain hydrocarbon compounds as the solvent, it has been found in practice that these solvents have the disadvantage of evaporating and causing a portion of the acid to precipitate out from the solution when a saturated solution is provided. It has also been found that certain of these solvents provide a source of danger from fire hazard or the like, and for this reason alcohols are preferred over ethers and ketones and other such compounds that might tend to be dangerous.

In order to provide a safer composition, it is preferred to utilize a solvent which is substantially non-evaporative and which is non-inflammable at room temperatures, so that the flux can be safely handled without danger of fire hazard or other associated problems. In addition, it is also preferable to utilize a compound which is non-injurious to the human body. For these reasons, the preferred solvent is dimethyl sulfoxide. This material is relatively non-evaporating, having a boiling point of about 18.4° C., and it is also non-inflammable. In addition, this compound is utilized in the drug industry for the treatment of burns and the like and is considered to be safe insofar as contact with the human skin is concerned.

In addition to the solvent, certain other inert ingredients may be provided, if desired, such as a lacquer which is sometimes used as a protective coating, or other materials. However, these inert materials should be present in a minimal amount to avoid any adverse affect on the welding process. Generally, such inert materials will be present in amounts of less than 10% by weight and preferably in amounts less than 5% by weight.

The amount of solvent utilized should be sufficient to provide a saturated solution and amounts beyond the point of saturation serve only to reduce the amount of the active flux ingredient and is therefore not as suitable as the saturated solution. However, certain excesses of solvents can be tolerated, and, in some cases, it might be desirable to utilize these excesses in order to provide a more stable solution. Accordingly, it is preferred that the composition consist essentially of a dicarboxylic acid of the character described and a solvent material, with the dicarboxylic acid being present as the major ingredient.

In order to illustrate the invention more fully, the following examples are given, and it will be appreciated that these examples are given for the sake of illustration only and are not intended to limit the scope of the invention.

Example I

A flux composition is prepared by adding dimethyl sulfoxide gradually to a fixed amount of azelaic acid while stirring and continuing the addition until a sufficient amount of the dimethyl sulfoxide is added to provide a homogeneous liquid or solution. The solution is then used for welding lead battery elements together in accordance with the following procedures:

Lead plates are formed by casting a suitable lead composition in the usual manner and then hardened in the usual manner. The plates are then placed on a pasting machine, where a mixture of lead sulfate, lead oxide, lead and water is pasted onto the plates in accordance with the usual procedures for providing positive and negative plates. Although the usual procedures call for pasting the entire plate except for the lug portions, and careful operators can avoid contacting the lugs with paste, it has been found that occasionally some paste inadvertently contacts the lug and causes an oxide coating to be formed thereon. After pasting, the plates are dried quickly and then stored for a time sufficient to dry fully. After the plates have been dried, and are ready to be welded in assembled fashion to the battery straps, the flux composition of this example is applied evenly over the entire surface to be welded. Preferably, the welding is carried out by the cast-on process by utilizing the procedure described in co-pending U.S. patent application Ser. No. 372,524, filed June 4, 1964, entitled Method and Apparatus for Fabricating Battery Connector Straps. However, any other known cast-on procedures or even the lead burning process may be used. The important factor is the use of the flux composition prepared above to coat the surfaces of the lugs prior to casting the battery straps thereon, or to coat both the surfaces of the lugs and battery straps where the burning process is used.

It has been found in practice that the oxide which tends to form during storage will not prevent a complete and satisfactory weld even when utilizing any of the known cast-on processes. It has also been found in practice that some contact of paste on the lugs may be tolerated without destroying the resultant weld when the flux composition of this example is utilized. As opposed to this, it has been found that when using fluxes heretofore in use, failures in welds occur quite frequently where build-ups of lead oxide and contacts with paste occur on the lug prior to welding unless care is taken to remove this oxide coating prior to welding.

Example II

The procedure of Example I is repeated except that methyl alcohol is utilized in the solvent instead of dimethyl sulfoxide. Similarly improved results are obtained when utilizing the composition of Example II.

Example III

The procedure of Example I is repeated except that the dicarboxylic acid utilized is sebacic acid. This flux composition also provides excellent results.

Example IV

The procedure of Example I is repeated except that adipic acid is utilized in place of azelaic acid. Excellent results are also obtained with this flux composition.

From the examples given above, it is seen that beneficial results are achieved in the attachment of the lugs to the post battery straps when the flux of this invention is applied because the flux is far more effective in facilitating the process of melting two adjacent lead surfaces into each other to provide a good weld bond in the presence of lead oxide and the like than are the fluxes heretofore utilized. It is also seen that the utilization of this flux allows for the saving of a process step where paste is inadvertently applied to the lugs of the battery, or where the battery plates are stored for an excessive period of time prior to welding. In addition, it is seen that the preferred composition provides a stable flux solution which is safe and easy to handle.

I claim:

1. A process for welding lead onto lead by standard welding processes such as the cast-on process and the burning process, comprising the step of applying a composition to the surface of the lead to be welded prior to the welding of the surface, said composition comprising as the active ingredient a dicarboxylic acid of the formula $$HOOC(CH_2)_nCOOH$$

where $n$ is an integer from 3 to 10.

2. The process for welding lead onto lead defined in claim 1, in which the dicarboxylic acid is azelaic acid.

3. A process for welding lead into lead by conventional welding processes such as the cast-on process and the burning process, comprising the step of applying a composition to the surface of the lead to be welded prior to the welding of the surface, said composition comprising a solution of a dicarboxylic acid of the formula $$HOOC(CH_2)_nCOOH$$

where $n$ is an integer of 3 to 10, and a solvent for said dicarboxylic acid, said solvent being present in an amount sufficient to dissolve all of the acid present.

4. The process for welding lead onto lead defined in claim 3, in which the dicarboxylic acid is azealic acid.

5. The process for welding lead onto lead defined in claim 3, in which the dicarboxylic acid is sebacic acid.

6. A process for joining lead elements for use in storage batteries by conventional processes such as the cast-on process and burning process, comprising the step of applying a composition to the surface of the lead to be welded prior to the welding of the surface, said composition consisting essentially of a major portion of a dicarboxylic acid of the formula $$HOOC(CH_2)_nCOOH$$

where $n$ is an integer from 3 to 10, and a solvent capable of dissolving said dicarboxylic acid in the quantity indicated, said solvent being present in an amount sufficient to dissolve all of the acid present.

7. A process for welding lead onto lead by conventional processes such as the cast-on process and the burning process, comprising the step of applying a composition to the surface of the lead to be welded prior to the welding of the surface, said composition comprising a solution of a dicarboxylic acid of the formula $$HOOC(CH_2)_nCOOH$$

where $n$ is an integer of 3 to 10, a solvent consisting of dimethyl sulfoxide, said solvent being present in an amount sufficient to dissolve all of the acid present.

8. The process for welding lead onto lead defined in claim 7, in which the dicarboxylic acid is axelaic acid.

References Cited

UNITED STATES PATENTS 3,264,146   8/1966   Marks _____ 148—23

L. DEWAYNE RUTLEDGE, *Primary Examiner.*

WAYLAND W. STALLARD, *Assistant Examiner.*